United States Patent [19]
Hon

[11] Patent Number: 6,026,909
[45] Date of Patent: Feb. 22, 2000

[54] POWER TOOL

[75] Inventor: Sing Kwong Hon, New Territories, The Hong Kong Special Administrative Region of the People's Republic of China

[73] Assignee: Techtronic Industries Co., Ltd., New Territories, The Hong Kong Special Administrative Region of the People's Republic of China

[21] Appl. No.: 09/182,227

[22] Filed: Oct. 30, 1998

[51] Int. Cl.[7] .................................................. F16D 3/00
[52] U.S. Cl. ........................... 173/162.1; 173/216; 30/388
[58] Field of Search .............................. 30/388, 390, 391, 30/277.4, 389, 276, 122; 403/13, 14, 11; 173/216, 217, 162.1, 162.2; 81/57.11

[56] References Cited

U.S. PATENT DOCUMENTS

| | | | |
|---|---|---|---|
| 1,255,657 | 2/1918 | Steiheimer | 30/276 |
| 1,674,003 | 6/1928 | Casey | 30/377 |
| 1,803,068 | 4/1931 | McKeage | 30/390 |
| 2,586,530 | 2/1952 | Godfrey | 30/388 |
| 3,177,909 | 4/1965 | Laube et al. | 30/391 |
| 3,266,535 | 8/1966 | Brodie | 30/390 |
| 3,456,696 | 7/1969 | Gregory et al. | 30/388 |
| 3,682,277 | 8/1972 | Brown | 188/73.3 |
| 4,334,599 | 6/1982 | Ritsema et al. | 188/73.45 |
| 4,732,519 | 3/1988 | Wagner | 403/14 |
| 4,856,394 | 8/1989 | Clowers | 30/390 |
| 4,878,405 | 11/1989 | Wolfe | 81/57.11 |
| 5,023,999 | 6/1991 | Looper et al. | 30/390 |
| 5,375,666 | 12/1994 | Pettet et al. | 30/276 |
| 5,730,561 | 3/1998 | Wambeke | 30/122 |
| 5,832,611 | 11/1998 | Schmitz | 30/122 |
| 5,873,282 | 2/1999 | Dibbern, Jr. et al. | 30/391 |

*Primary Examiner*—M. Rachuba
*Assistant Examiner*—Dominic Troiano
*Attorney, Agent, or Firm*—Leydig, Voit & Mayer, Ltd.

[57] ABSTRACT

In a circular saw, a high speed motor has a housing attached to a casing by a mechanical coupling including bolts, circular sleeves, and end washers. A speed reduction gearbox includes first and second gears. The sleeve fits inside a circular channel. When the bolts are tightened, the casing is free to move, to some extent, relative to the housing, so the gear self-align and are much less noisy during use. This structure also enables less precise quality control for the manufacture of the relevant components of the saw.

2 Claims, 2 Drawing Sheets

POWER TOOL

BACKGROUND OF THE INVENTION

1. Field of the Invention

The invention relates to power tools.

2. Description of Prior Art

The invention relates particularly to relatively small or domestic power tools that are capable of being hand-held by a user. Such tools typically include circular saws or hedge-trimmers. A common feature of such tools is a high speed electric motor and a speed reduction gear-box located, between the motor and the driven implement, that is assembled together in a production facility. It is technically possible to design and manufacture the motor and the gear-box to high precision so that the implement drive works efficiently and with minimum noise but such design philosophy leads to significant or high cost and makes these small power tools too expensive.

SUMMARY OF THE INVENTION

It is an object of the invention to overcome or at least reduce this problem.

According to the invention there is provided a hand-holdable power tool having a high speed electric motor and a speed reduction gear-box for transferring power to an implement, in which the motor has a housing and a central rotor and the gear-box comprises a first gear fixed to one end of the rotor and another gear supported in a casing and meshing with the first gear, and a mechanical coupling arranged to hold the casing to the housing allowing meshing play between the first and second gears.

The mechanical coupling may comprise a plurality of bolts arranged to allow backwards, forwards, pitch, and yaw movements between the casing and the housing when the bolts are fully tightened.

Each bolt may be surrounded by a sleeve that bears firmly against the housing when the bolt is tightended and which fits loosely inside a channel in the casing to allow the pitch and yaw movements.

A saw blade may be mounted on a shaft that supports the second gear.

BRIEF DESCRIPTION OF THE DRAWINGS

A hand-holdable electrically powered circular saw according to the invention will now be described by way of example with reference to the accompanying drawings in which.

DESCRIPTION OF THE PREFERRED EMBODIMENT

Figure 1:
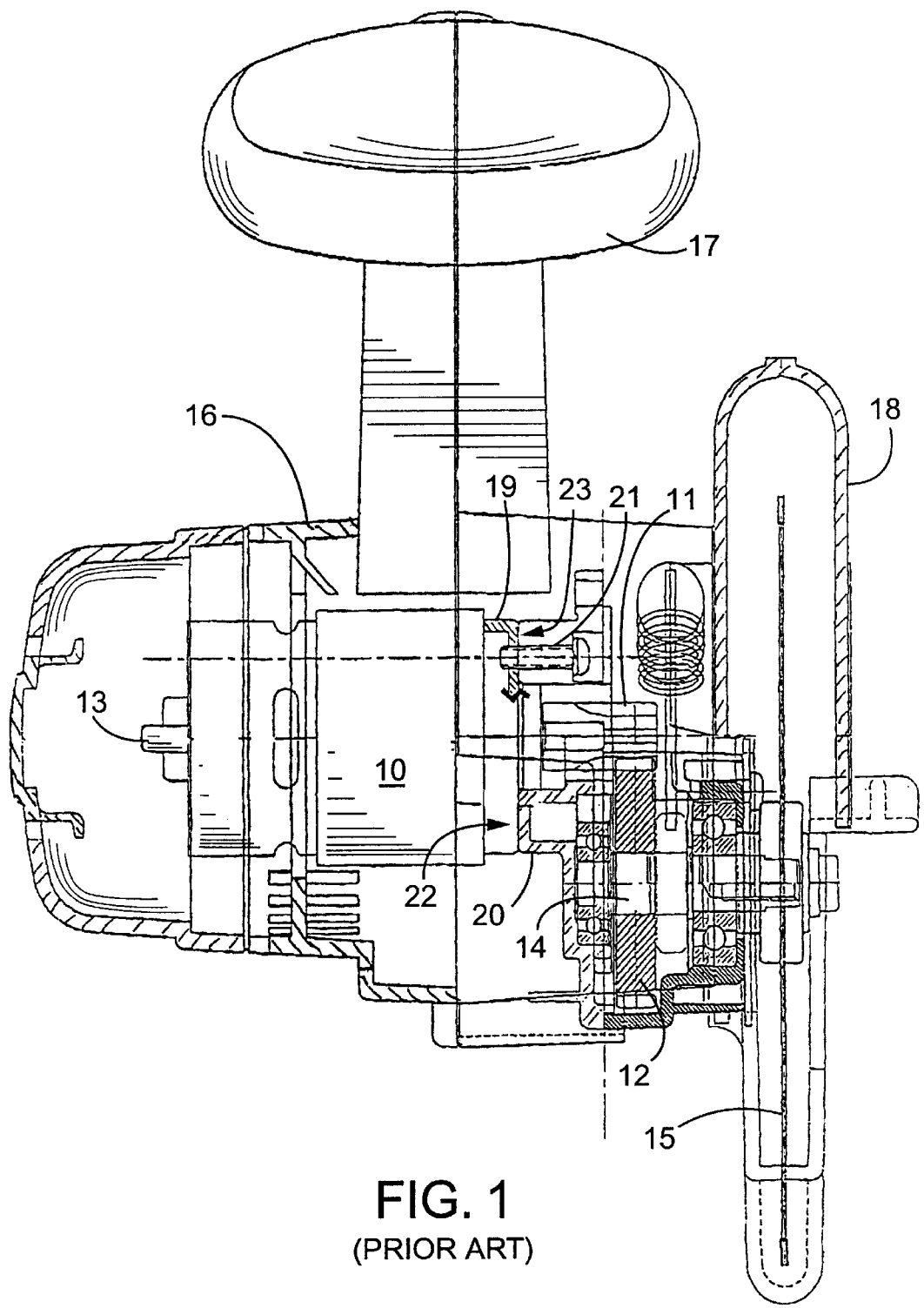
FIG. 1 is a sectional end view of a circular saw.

Referring to the drawings, FIG. 1 show a configuration of a circular saw that is generally known. The saw includes a high speed electric motor 10 (typically 16000 r.p.m.) and a speed reduction gear-box comprising a first gear 11 and a second gear 12. The first gear is mounted on a rotor 13 of the motor and the second gear is mounted on an output shaft 14 that also carries a circular saw blade 15. The circular saw has an outer plastic housing 16 with an integral handle 17 and is provided with a spring-loaded rotatable blade guard 18. A housing 19 for the motor 10 is held to a gear-box casing 20 by a mechanical coupling comprising two bolts 21 (only one bolt is shown in the Figure) on opposite sides of the gear 11. Thus, respective matching faces 22 and 23 of the housing 19 and the casing 20 are firmly held together when the bolts are fully tightened. As a results the gears 11 and 12 are firmly held in a fixed alignment and meshing configuration.

Figure 2:
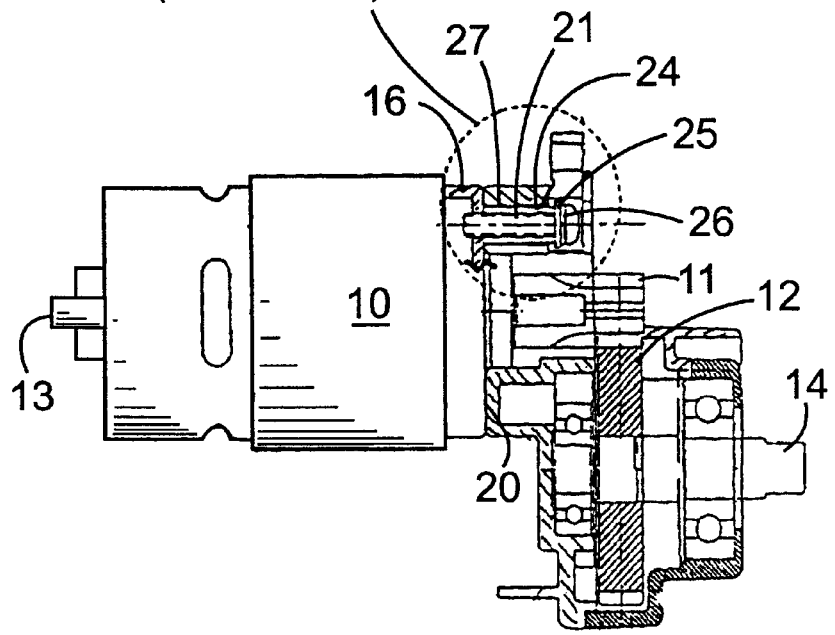
FIG. 2 is a sectional end view of a motor and gear-box for a saw according to the invention.

In FIG. 2, an improvement, in accordance with the invention, is illustrated. The bolts 21 (only one bolt is shown) are each surrounded by a circular sleeve 24 that is provided with a flat end washer 25 and a spring washer 26. The sleeve 24 fits inside a circular channel 27 in the casing 20. These latter components are more clearly shown in FIG. 3.

It will be appreciated that, when the bolts 21 are fully tightened, the end faces 22 and 23 are free to move to some extent, both away and towards each other (or in other words, the casing 20 can more backwards and forwards with respect to the housing 16). Also, because there is a clearance between an outside surface of the sleeve 24 and an inside surface of the channel 27, the casing 20 can pitch and yaw with respect to the housing 16.

Figure 3:
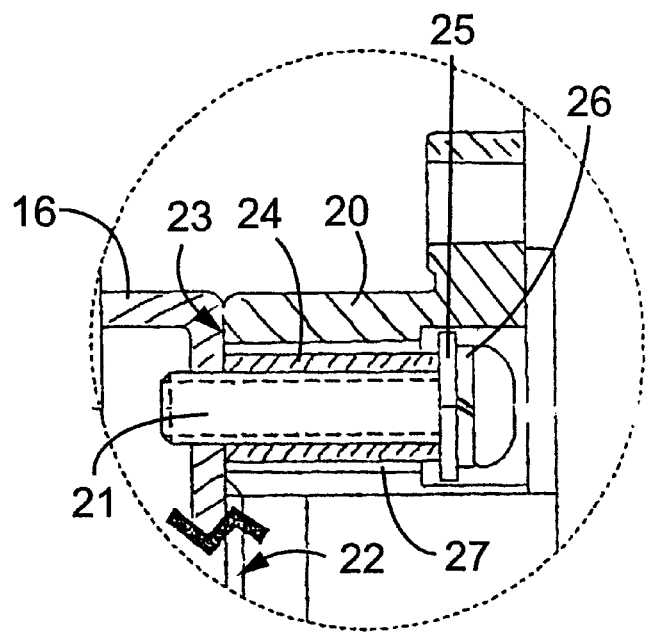
FIG. 3 shows part of FIG. 2 in a larger scale.

The mechanical coupling shown in FIGS. 2 and 3, and comprising the bolts 21 and the sleeves 24, therefore allows or to permits meshing play between the gears 11 and 12 while never-the-less retaining the housing 16 and casing 20 mechanically securely coupled together.

In practice, this provides at least two advantages. Firstly, the quality control requirements for the production of the components themselves, in particular the motor 10 and the gears 11 and 12 are less severe and, as well, the mounting alignment requirements for satisfactory assembly of the circular saw are not so critical. These features enable the use of cheaper components and reduced manufacturing costs. Secondly, in operation, the gear meshing is remarkably less noisy. This is now believed to be due to the "loose" or "soft" mechanical coupling (provided by the bolts 21 and sleeves 24 in FIGS. 2 and 3), allowing the gears 11 and 12 to self-align into a good meshing configuration. Due to rotational inertia, a best alignment for meshing is automatically maintained during normal use or operation of the circular saw. This leads in practice to less gear wear and less motor vibration, and extended useful life.

It will be appreciated that other "loose" mechanical couplings can be used that allow relative lateral movement between the housing 16 and the casing, as well as pitch and yaw, to achieve the advantages of the arrangement described in FIGS. 2 and 3. For example, rubber mountings may alternatively or additionally be used.

I claim:

1. A hand-held power tool comprising:

a casing;

a high speed electric motor having a housing and a central rotor;

a speed reduction gear-box for transferring power from the motor to an implement, the gear-box comprising a first gear fixed to one end of the rotor and the second gear supported in the casing and meshing with the first gear; and a mechanical coupling holding the casing to the housing and comprising a plurality of bolts allowing backwards, forwards, pitch, and yaw movements between the casing and the housing when the bolts are fully tightened, each bolt being surrounded by a sleeve bearing against the housing when the bolt is tightened and fitting inside a channel in the casing to allow the pitch and yaw movements.

2. A hand-held circular saw comprising:

a casing;

a high speed electric motor having a housing and a central rotor;

a speed reduction gear-box for transferring power from the motor to an implement, the gear-box comprising a first gear fixed to one end of the rotor and the second gear supported in the casing on a shaft and meshing with the first gear;

a mechanical coupling holding the casing to the housing and comprising a plurality of bolts allowing backwards, forwards, pitch, and yaw movements between the casing and the housing when the bolts are fully tightened, each bolt being surrounded by a sleeve bearing against the housing when the bolt is tightened and fitting inside a channel in the casing to allow the pitch and yaw movements; and a saw blade mounted on the shaft.

* * * * *